(12) United States Patent
Yabata

(10) Patent No.: US 10,609,658 B2
(45) Date of Patent: Mar. 31, 2020

(54) COMMUNICATION APPARATUS, COMMUNICATION PROCESSING METHOD, AND RECORDING MEDIUM

(71) Applicant: ALPS ALPINE CO., LTD., Tokyo (JP)

(72) Inventor: Tetsuya Yabata, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 16/406,239

(22) Filed: May 8, 2019

(65) Prior Publication Data
US 2019/0268860 A1  Aug. 29, 2019

Related U.S. Application Data

(63) Continuation of application No. PCT/JP2017/038395, filed on Oct. 24, 2017.

(30) Foreign Application Priority Data

Nov. 15, 2016  (JP) .................................. 2016-222474

(51) Int. Cl.
*H04W 52/36* (2009.01)
*H04B 17/327* (2015.01)
(Continued)

(52) U.S. Cl.
CPC .......... *H04W 52/36* (2013.01); *H04B 17/327* (2015.01); *H04M 1/00* (2013.01);
(Continued)

(58) Field of Classification Search
CPC ... H04W 40/12; H04W 28/04; H04W 52/241; H04W 52/36; H04W 76/30; H04W 84/10
See application file for complete search history.

(56) References Cited

U.S. PATENT DOCUMENTS

| 2006/0013130 A1 | 1/2006 | Bloebaum |
| 2008/0291941 A1* | 11/2008 | Sakai ..................... G06F 9/545 |
| | | 370/469 |
| 2012/0165011 A1 | 6/2012 | Ge et al. |

FOREIGN PATENT DOCUMENTS

| JP | 2007-013538 | 1/2007 |
| JP | 2008-507199 | 3/2008 |
| JP | 2015-019230 | 1/2015 |

OTHER PUBLICATIONS

International Search Report dated Jan. 16, 2018 in PCT/JP2017/038395 filed on Oct. 24, 2017.

* cited by examiner

*Primary Examiner* — Keith Ferguson
(74) *Attorney, Agent, or Firm* — IPUSA, PLLC

(57) ABSTRACT

A communication apparatus that communicates with a counterpart apparatus in accordance with a hierarchical communication protocol that includes a first layer and a second layer higher than the first layer is provided. In the communication apparatus, in a case where received signal strength is less than a threshold in a received signal strength checking process repeated N times and a notification is not output from a first communication processor 10 in at least a predetermined period of time that includes a period of time during which the received signal strength checking process is repeated N times, a second command to terminate the connection with the counterpart apparatus is input into the first communication processor 10, so as to prevent a situation in which a packet is repeatedly retransmitted.

9 Claims, 8 Drawing Sheets

(51) Int. Cl.
*H04W 76/30* (2018.01)
*H04W 52/24* (2009.01)
*H04W 28/04* (2009.01)
*H04W 84/10* (2009.01)
*H04M 1/00* (2006.01)

(52) U.S. Cl.
CPC ......... *H04W 28/04* (2013.01); *H04W 52/241* (2013.01); *H04W 76/30* (2018.02); *H04W 84/10* (2013.01)

COMMUNICATION APPARATUS, COMMUNICATION PROCESSING METHOD, AND RECORDING MEDIUM

CROSS-REFERENCE TO RELATED APPLICATIONS

This application is a continuation of International Application No. PCT/JP2017/038395 filed on Oct. 24, 2017 and designating the U.S., which claims priority to Japanese Patent Application No. 2016-222474 filed on Nov. 15, 2016. The contents of these applications are incorporated herein by reference in their entirety.

BACKGROUND OF THE INVENTION

1. Field of the Invention

The disclosures herein generally relate to a communication apparatus that performs communication in accordance with a hierarchical communication protocol, and specifically relate to a communication apparatus that performs communication via Bluetooth (registered trademark).

2. Description of the Related Art

Conventionally, in wireless communication, various measures have been taken to overcome communication failures such as interference with external radio waves and deterioration in propagation of radio waves. For example, in a data communication apparatus described in Patent Document 1 below, when a communication path status determining means determines that a communication failure has occurred, transmission power is increased. In addition, in a communication terminal described in Patent Document 2 below, a packet is retransmitted when an acknowledgment package has not been received, and retransmission of the packet is stopped when the number of times of retransmission reaches the upper limit.

RELATED-ART DOCUMENTS

[PATENT DOCUMENT 1] Japanese Laid-open Patent Publication No. 2007-13538
[PATENT DOCUMENT 2] Japanese Laid-open Patent Publication No. 2015-19230

SUMMARY OF THE INVENTION

Problem to be Solved by the Invention

In Bluetooth (hereinafter may be abbreviated to "BT"), there are two packet communication links: a circuit-switched synchronous connection-oriented (SCO) link and a storage-switched asynchronous connectionless (ACL) link. The SCO is used to transmit data that requires immediacy (such as voice data during a call) and the ACL is used to transmit data (such as music data during playback) that requires no information to be missing. An ACL packet is retransmitted when no acknowledgment has been received from a counterpart apparatus due to a communication failure or other failures. If no acknowledgment is received for a certain period of time after the packet is retransmitted, the connection with the counterpart apparatus is automatically terminated.

Conversely, even if a packet itself can be received, data in the packet may be partially corrupted. In BT, a packet error is detected in the Link Manager, which is a layer below the Host Controller Interface (HCI). When a packet error is detected in the Link Manager, "NAK" indicating a negative acknowledgement is set as a value of "automatic repeat request number (ARQN)" in the header of the packet returned to a transmitter. If the value of "ARQN" is "NAK", the transmitter retransmits the same packet.

If an error is again detected in the retransmitted packet, a packet "ARQN"="NAK" is returned to the transmitter, and the same packet is retransmitted again. Namely, as long as a packet error is detected in the transmitter, the same packet is endlessly retransmitted from the transmitter (hereinafter referred to as an "infinite loop"). In a protocol having an error correction function using frame retransmission, when a packet fails to be transmitted successfully, a pointer of a transmission queue does not move to the next address. Thus, when a packet is repeatedly retransmitted, the packet remains in the queue, preventing subsequent packets from being transmitted. As a result, the transmitter cannot accept a command and cannot send a request for disconnection. In addition, the state of a packet retransmission process performed in the Link Manager is not indicated to a higher layer according to the BT specification. Therefore, the higher layer cannot determine whether the packet retransmission process is in the above-described infinite loop based on a notification from the Link Manager. Accordingly, in the event of an infinite loop, a packet cannot be transmitted or received unless the user forcibly performs an operation such as turning the power on again, and such an undesirable condition cannot be autonomously avoided.

In order to solve the above-described problem, it is conceived that a process for automatically detecting an infinite loop and terminating the connection is performed in the lower layer (Link Manager). However, because lower layer processes are generally performed in dedicated hardware, it is difficult to perform additional processes that are not included in the basic BT specification in the lower layer.

SUMMARY OF THE INVENTION

It is an object of the present invention to provide a communication apparatus, a communication processing method, and a recording medium, in which a process performed in a higher layer can eliminate endlessly repeated packet retransmission in a lower layer.

According to at least one embodiment, a communication apparatus that communicates with a counterpart apparatus in accordance with a hierarchical communication protocol including a first layer and a second layer higher than the first layer is provided. The communication apparatus includes a first communication processor configured to perform processes in the first layer, and a second communication processor configured to perform a process in the second layer. The processes performed in the first layer include a packet retransmission process for, when an error in a packet is detected in the communication apparatus on a receiving side, sending a request to retransmit the same packet from the communication apparatus on the receiving side to the counterpart apparatus on a transmitting side, and to retransmit the same packet from the counterpart apparatus on the transmitting side in response to the request, a received signal strength obtaining process to obtain the received signal strength in response to a first command from the second layer, and a disconnection process to terminate the connection with the counterpart apparatus in response to a second command from the second layer. The second communication processor is configured to measure a continuous period of time during which a notification, to be sent from the first layer to the second layer while the communication apparatus is connected to the counterpart apparatus, is not output from the first communication processor; repeat a received signal strength checking process a plurality of times at intervals of a second duration in a case where the measured period of time has reached a first duration; and input the second command into the first communication processor, in a case where the received signal strength is below the threshold in the received signal strength checking process repeated the plurality of times, and where the notification is not sent from the first communication processor in at least a predetermined period of time that includes a period of time during which the received signal strength checking process is repeated the plurality of times, wherein, in the received signal strength checking process repeated the plurality of times, the first command is input into the first communication processor, and received signal strength that is obtained by the first communication processor in response to the first command is compared to a threshold.

According to at least one embodiment, there is provided a communication processing method for performing a process in the second layer by a computer, in a communication apparatus that communicates with a counterpart apparatus in accordance with a hierarchical communication protocol that includes a first layer and a second layer higher than the first layer. The communication apparatus includes a communication processing unit configured to perform processes in the first layer. The processes performed in the first layer include a packet retransmission process for, when an error in a packet is detected in the communication apparatus on a receiving side, sending a request to retransmit the same packet from the communication apparatus on the receiving side to the counterpart apparatus on a transmitting side, and retransmitting the same packet from the counterpart apparatus on the transmitting side in response to the request, a received signal strength obtaining process for obtaining received signal strength in response to a first command from the second layer, and a disconnection process for terminating connection with the counterpart apparatus in response to a second command from the second layer. The communication processing method includes measuring a continuous period of time during which a notification, to be sent from the first layer to the second layer while the communication apparatus is connected to the counterpart apparatus, is not output from the first communication processor; repeating a received signal strength checking process a plurality of times at intervals of a second duration in a case where the measured period of time reached a first duration; and inputting the second command into the first communication processor, in a case where the received signal strength is below the threshold in the received signal strength checking process repeated the plurality of times and the notification is not sent from the first communication processor in at least a predetermined period of time that includes a period of time during which the received signal strength checking process is repeated the plurality of times, wherein, in the received signal strength checking process repeated the plurality of times, the first command is input into the first communication processor, and received signal strength that is obtained by the first communication processor in response to the first command is compared to a threshold.

Other objects and further features of the present invention will be apparent from the following detailed description when read in conjunction with the accompanying drawings.

DESCRIPTION OF THE EMBODIMENTS

According to one embodiment, a process performed in a higher layer of a hierarchical communication protocol eliminates a situation in which retransmission of a packet is endlessly repeated in a lower layer.

Figure 1:
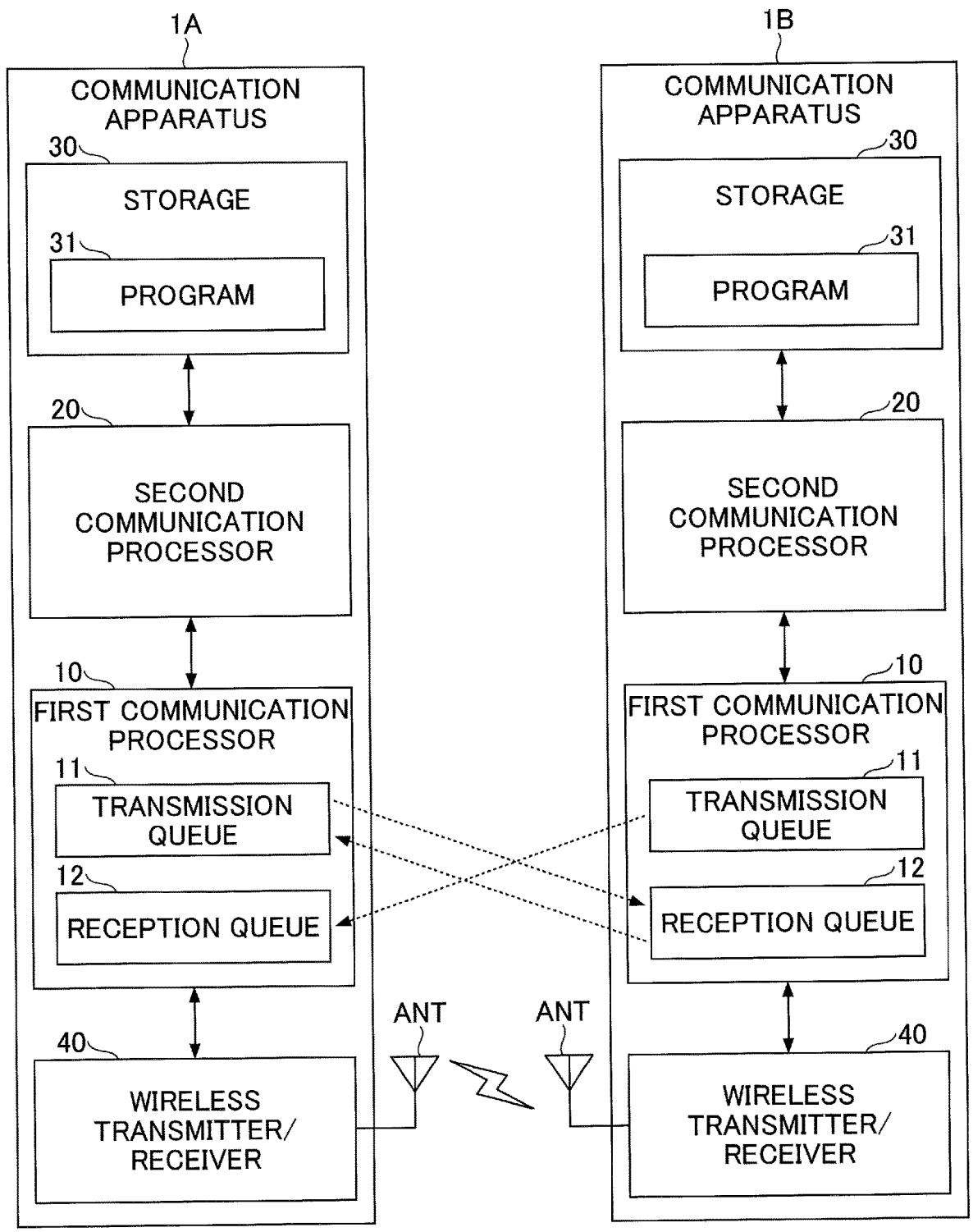
FIG. 1 is a diagram illustrating example configurations of communication apparatuses according to an embodiment of the present invention.

In the following, embodiments of the present invention will be described with reference to the accompanying drawings. FIG. 1 is a diagram illustrating example configurations of communication apparatuses (1A and 1B) according to an embodiment of the present invention. In the present embodiment, a communication apparatus 1A and a communication apparatus 1B wirelessly communicate with each other in accordance with a BT communication protocol. As illustrated in FIG. 1, each of the communication apparatus 1A and the communication apparatus 1B includes a first communication processor 10, a second communication processor 20, a storage 30, a wireless transmitter/receiver 40, and an antenna ANT. In the following description, the communication apparatus 1A and the communication apparatus 1B may be, if not distinguished, referred to as "communication apparatuses 1". Further, when viewed from one communication apparatus 1, the other communication apparatus 1" may be referred to as a "counterpart apparatus."

Figure 2:
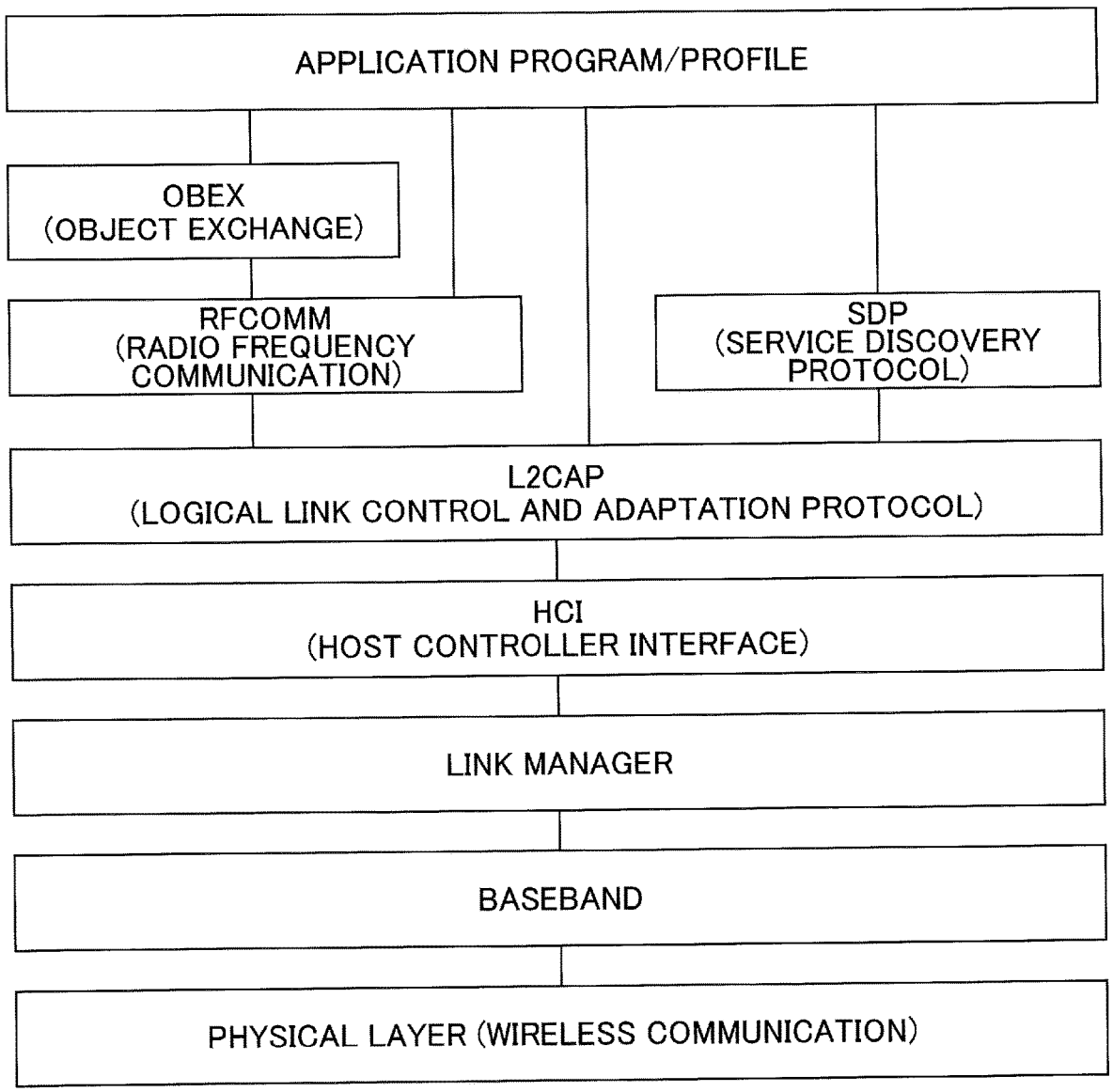
FIG. 2 is a diagram illustrating a hierarchical communication function of each of the communication apparatuses according to the embodiment.

FIG. 2 is a diagram illustrating a hierarchical communication function of each of the communication apparatuses according to the embodiment. In FIG. 2, the BT protocol stack is illustrated. In the following description, layers (such as a link manager and a baseband) lower than the Host Controller Interface (HCI) are referred to as a "first layer", and layers (such as a logical link control and adaptation protocol (L2CAP)) higher than the HCI are referred to as a "second layer".

The wireless transmitter/receiver 40 communicates over the 2.4 GHz wireless band in accordance with a BT communication scheme. More specifically, the wireless transmitter/receiver 40 performs wireless communication by using frequency-hopping spread spectrum in which frequency hopping is performed for each slot (for every 625 μseconds).

In the BT communication protocol, the first communication processor 10 performs communication processes in the first layer. In the present embodiment, the processes performed in the first layer include a packet retransmission process, a transmission power control process, a received signal strength obtaining process, a disconnection process, and an operation mode switching process.

The packet retransmission process is a process for requesting, when a packet error is detected in a receiving-side communication apparatus 1, retransmission of the same packet from the receiving-side communication apparatus 1 to a transmitting-side communication apparatus 1, and retransmitting the packet in response to the request from the transmitting-side communication apparatus 1. To be more specific, when a packet error is detected in the receiving-side communication apparatus 1, "NAK" is set as a value of "ARQN" in a packet returned to the transmitting-side communication apparatus 1. When the value of ARQN in the packet is "NAK", the same packet is retransmitted from the transmitting-side communication apparatus 1.

The transmission power control process is a process for requesting a change in transmission power from the receiving-side communication apparatus 1 to the transmitting-side communication apparatus 1 (hereinafter may be described as "from the receiving-side communication apparatus" to a counterpart apparatus), such that received signal strength at the receiving-side communication apparatus 1 falls within a target range, and changing the transmission power at the transmitting-side communication apparatus 1 (hereinafter may be referring to as a counterpart apparatus) in response to the request. More specifically, in order to increase the transmission power, an "LMP_incr_power_req" command is transmitted from the receiving-side communication apparatus 1 to the transmitting-side communication apparatus 1. Upon receiving the command, the transmitting-side communication apparatus 1 responds by increasing the transmission power by a predetermined level. In order to decrease the transmission power, an "LMP_decr_power_req" command is transmitted from the receiving-side communication apparatus 1 to the transmitting-side communication apparatus 1. Upon receiving the command, the transmitting-side communication apparatus 1 responds by decreasing the transmission power by a predetermined level.

The received signal strength obtaining process is a process for obtaining the current received signal strength in response to a command (a first command) from the second layer, which is the higher layer, and indicating the obtained received signal strength to the higher layer. To be more specific, when "HCI_RSSI" that is the first command is transmitted from the higher layer, received signal strength is obtained.

The disconnection process is a process for terminating the connection with a connected counterpart apparatus, in response to a command (a second command) from the second layer. More specifically, HCI_Disconnect is the second command that is transmitted from the higher layer, and when HCI_Disconnect is transmitted, an "LMP_detach" command is transmitted from the first layer to the connected counterpart apparatus. Then, the connection with the connected counterpart apparatus is terminated.

The operation mode switching process is a process for switching operation modes of communication frequency in response to a command from the higher layer. The operation modes to be switched in the operation mode switching process include a normal mode that does not limit communication frequency and a power saving mode that limits communication frequency to suppress power consumption. The operation modes are controlled by the higher layer.

As illustrated in FIG. 1, the first communication processor 10 includes a transmission queue 11 that stores packets waiting to be transmitted, and a reception queue 12 that stores packets waiting to be received. Packets stored in a corresponding queue are processed in order of input into the queue.

The second communication processor 20 performs a communication process in the second layer that is higher than the first layer. The second communication processor 20 includes a computer (such as a microprocessor) that executes an instruction based on a program 31 stored in the storage 30. The second communication processor 20 may cause the computer to perform all the processes, or may cause a dedicated logic circuit to perform at least some of the processes.

The second communication processor 20 of the communication apparatus 1 monitors a notification to be sent from the first layer to the second layer while being connected to the counterpart apparatus, and measures the period of time during which the notification (hereinafter may be referred to as a "monitoring target notification") is not output from the first communication processor 10 in normal mode. When the measured period of time has reached a first duration T1 (5 seconds, for example), the second communication processor 20 performs a received signal strength checking process at intervals of a second duration T2 (at intervals of five seconds, for example) repeatedly N times (five times, for example). In the received signal strength checking process repeated N times, the second communication processor 20 inputs the first command (HCI_RSSI) into the first communication processor 10, and compares, to a threshold Sth, received signal strength obtained by the first communication processor 10 in response to the first command. In the received signal strength checking process repeated N times, if the received signal strength does not reach the threshold Sth and the monitoring target notification is not output from the first communication processor 10 in at least a predetermined period of time that includes a period of time in which the received signal strength checking process is repeated N times (for example, T2×N or more), the second communication processor 20 inputs the second command to terminate the connection with the transmitting-side communication apparatus 1. When the first communication processor receives the second command, "LMP detach" is input into the transmission queue 11, and "LMP_detach" is transmitted to the reception queue 12 of the receiving-side communication apparatus 1.

Operations of the communication apparatuses 1 with the above-described configuration according to the embodiment will be described with reference to flowcharts illustrated in FIGS. 3 through 7.

Figure 3:
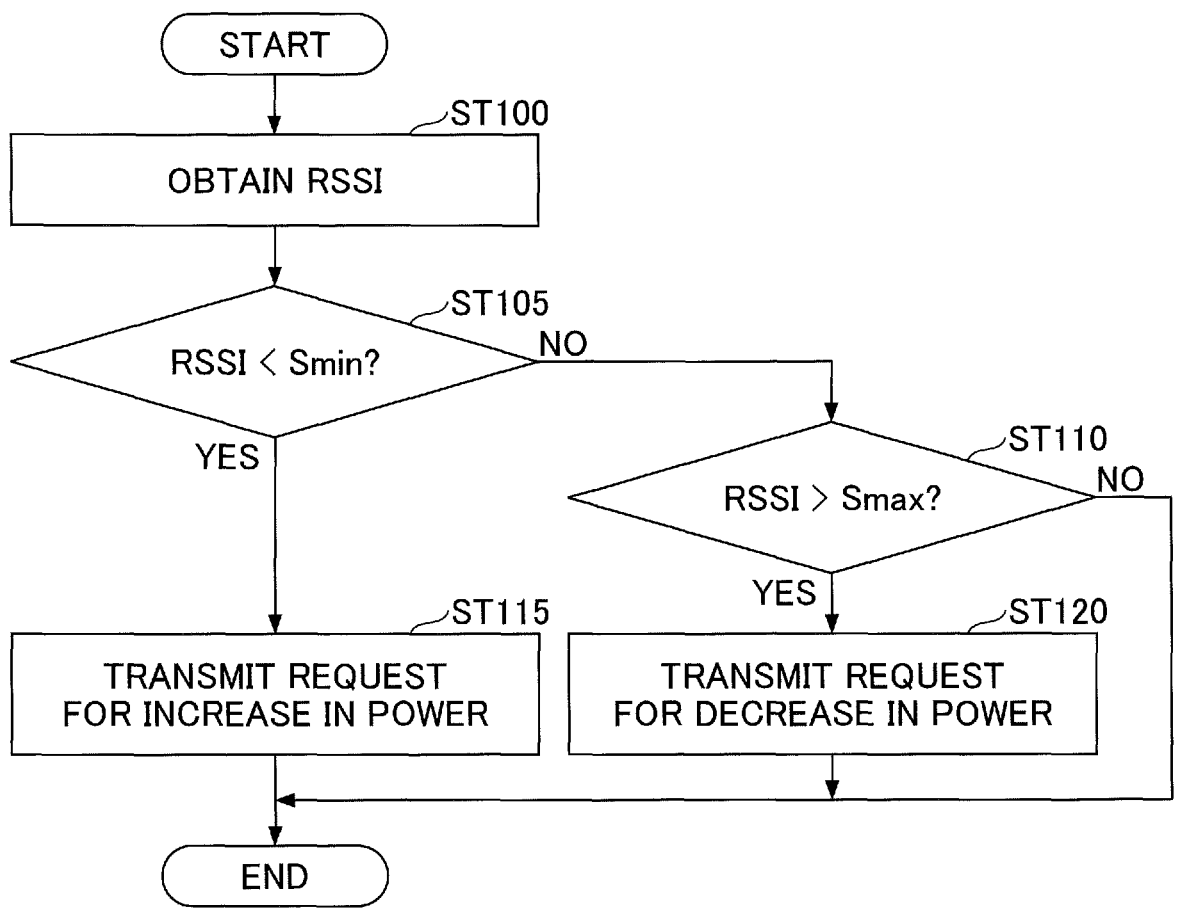
FIG. 3 is a flowchart illustrating a transmission power control process performed by a first communication processor of a receiving-side communication apparatus.

FIG. 3 is a flowchart illustrating a transmission power control process performed by a first communication processor 10 of the receiving-side communication apparatus 1. The first communication processor 10 performs the process illustrated in FIG. 3 at predetermined timings (for example, at predetermined time intervals).

The first communication processor 10 obtains signal strength of the latest packet received from a connected counterpart apparatus (ST100). Then, the first communication processor 10 compares the obtained signal strength to a predetermined minimum value Smin and to a predetermined maximum value Smax (ST105 and ST110). When the received signal strength is less than the minimum value Smin (yes in ST105), the first communication processor 10 transmits the "LMP_incr_power_req" command for requesting an increase in transmission power to the connected counterpart apparatus (ST115). Conversely, when the received signal strength is greater than the maximum value Smax (yes in ST110), the first communication processor 10 transmits the "LMP_decr_power_req" command for requesting a decrease in transmission power to the connected counterpart apparatus (ST120).

Figure 4:
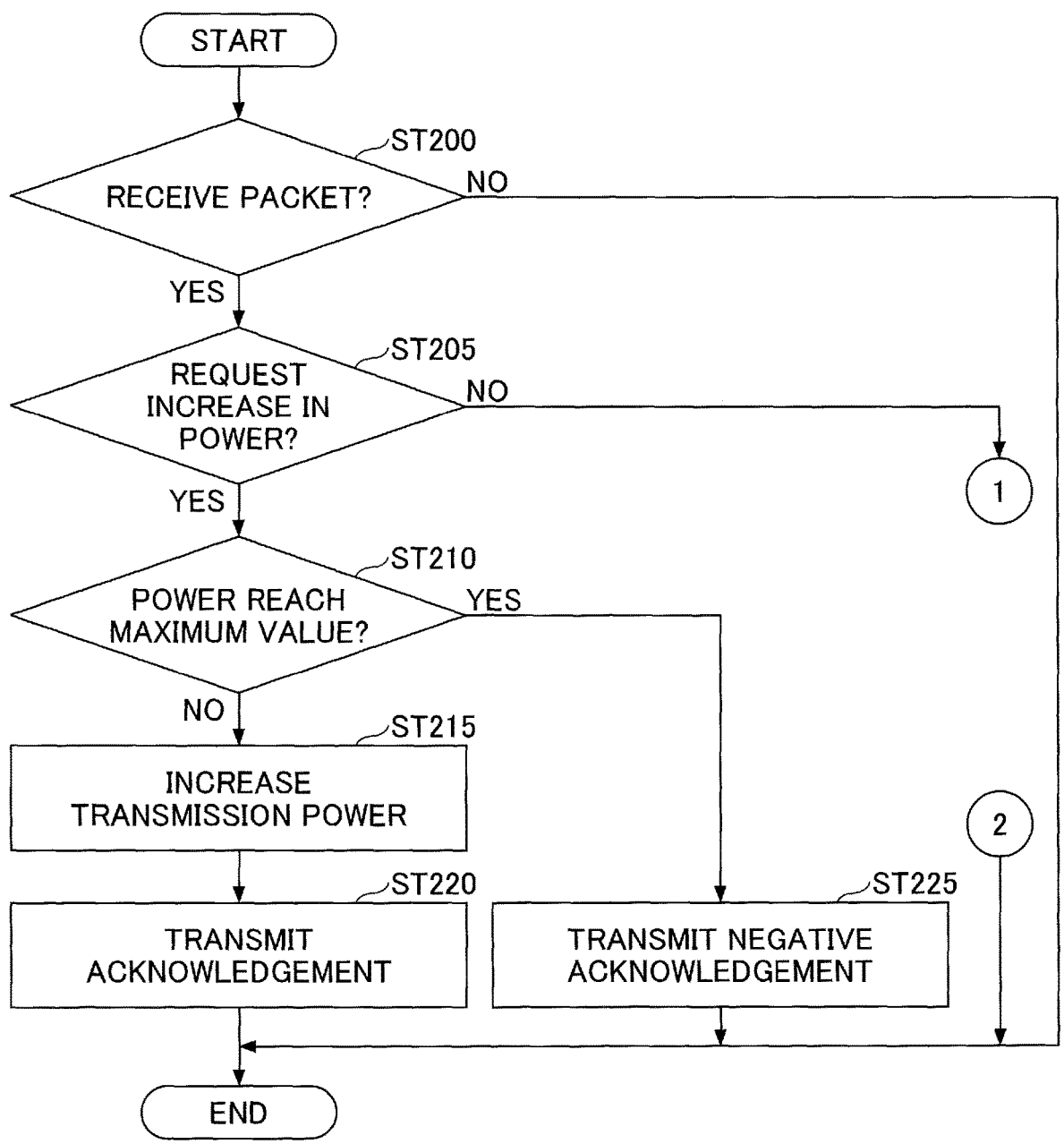
FIG. 4 is a first flowchart illustrating a transmission power control process performed by a first communication processor of a transmitting-side communication apparatus.
Figure 5:
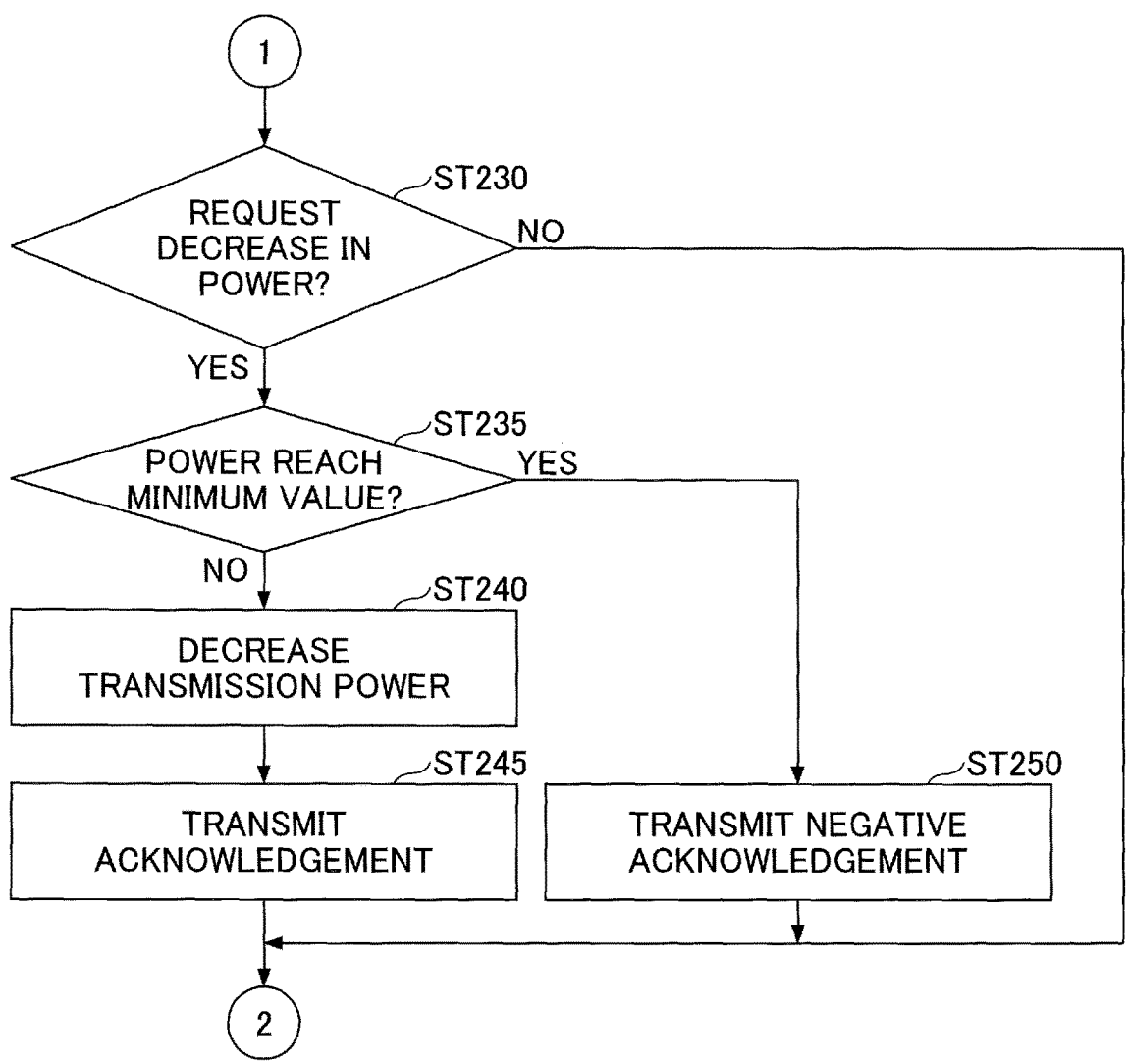
FIG. 5 is a second flowchart illustrating the transmission power control process performed by the first communication processor of the transmitting-side communication apparatus.

FIG. 4 and FIG. 5 are flowcharts illustrating a transmission power control process performed by a first communication processor 10 of the transmitting-side communication apparatus 1. The first communication processor 10 performs the process illustrated in FIG. 4 and FIG. 5 at predetermined timings (for example, at predetermined time intervals).

When the first communication processor 10 receives a packet from a connected counterpart apparatus (yes in ST200), the first communication processor 10 determines whether the "LMP_incr_power_req" command for requesting an increase in transmission power is included in the received packet (ST205). If the "LMP_incr_power_req" command is included in the received packet (yes in ST205), the first communication processor 10 further determines whether the current transmission power level has reached the predetermined maximum value (ST210). If the current transmission power level is less than the maximum value (no in ST210), the first communication processor 10 increases the transmission power level by a predetermined level (ST215), and transmits an acknowledgement of the request for an increase in transmission power to the connected counterpart apparatus (ST220). If the current transmission power level has reached the maximum value (yes in ST210), the first communication processor 10 transmits a negative acknowledgement of the request for an increase in transmission power to the connected counterpart apparatus (ST225).

Further, when the first communication processor 10 receives the packet from the connected counterpart apparatus (yes in ST200), the first communication processor 10 determines whether the "LMP_decr_power_req" command for requesting a decrease in transmission power is included in the received packet (ST230). If the "LMP_decr_power_req" command is included in the received packet (yes in ST230), the first communication processor 10 further determines whether the current transmission power level has reached the predetermined minimum value (ST235). If the current transmission power level is larger than the maximum value (no in ST235), the first communication processor 10 decreases the transmission power level by a predetermined level (ST240), and transmits an acknowledgement of the request for a decrease in transmission power to the connected counterpart apparatus (ST245). If the current transmission power level has reached the minimum value (yes in ST235), the first communication processor 10 transmits a negative acknowledgement of the request for a decrease in transmission power to the connected counterpart apparatus (ST250)

Figure 6:
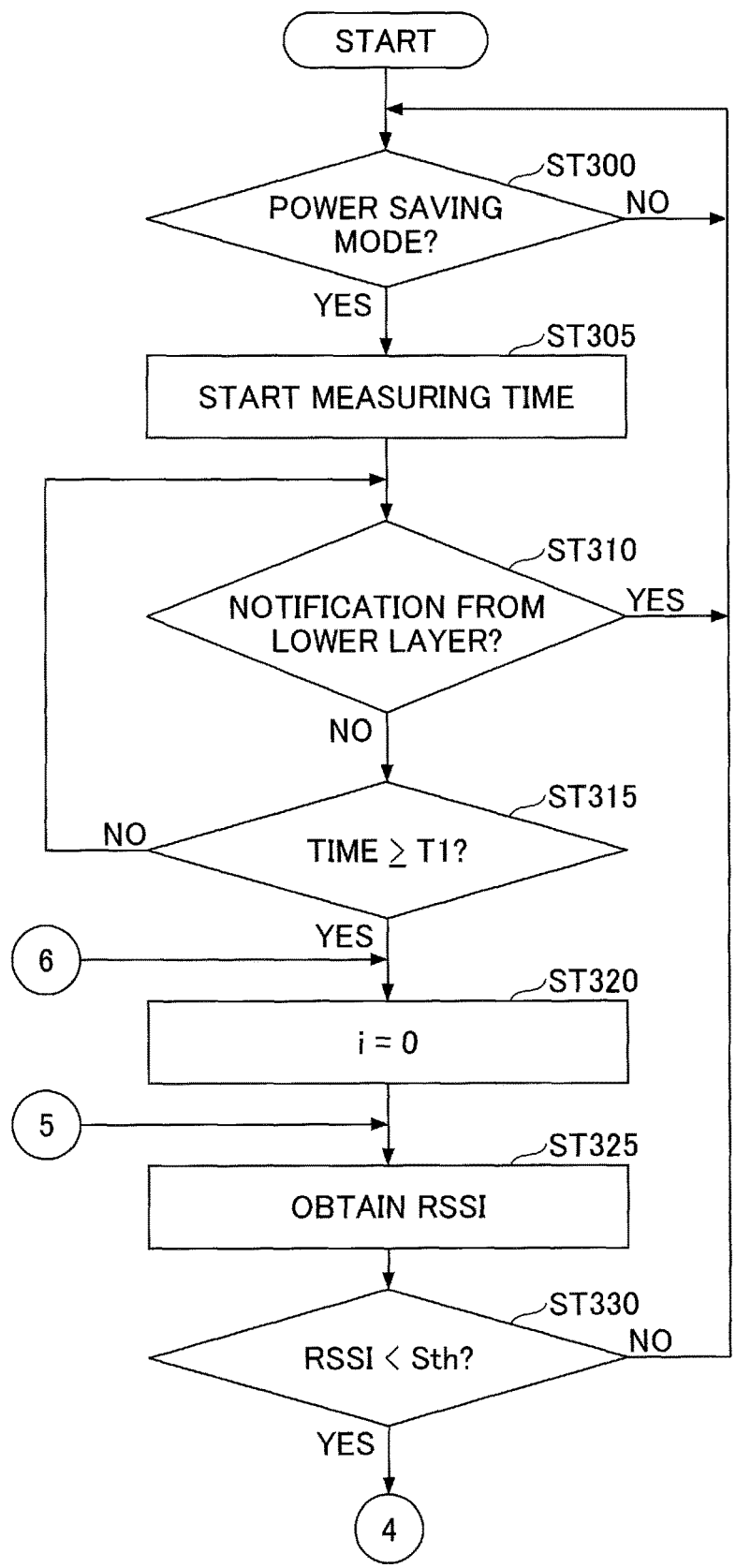
FIG. 6 is a first flowchart illustrating a disconnection process performed by a second communication processor of the receiving-side communication apparatus.
Figure 7:
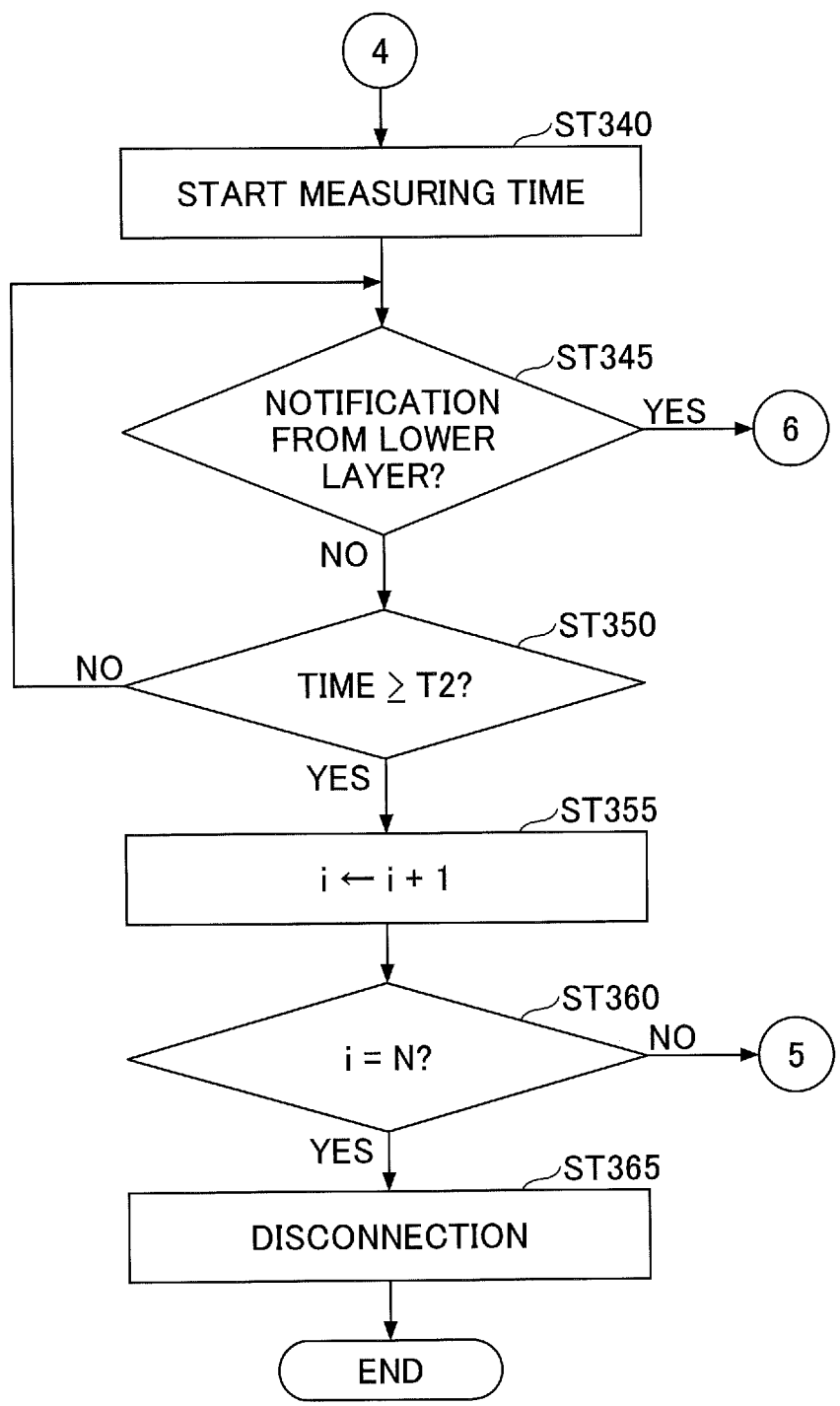
FIG. 7 is a second flowchart illustrating the disconnection process performed by the second communication processor of the receiving-side communication apparatus.

FIG. 6 and FIG. 7 are flowcharts illustrating a disconnection process performed by a second communication processor 20 of the receiving-side communication apparatus 1. The second communication processor 20 performs the process illustrated in FIG. 6 and FIG. 7 when there is a connected counterpart apparatus.

When the current operation mode is the power saving mode (yes in ST300), the second communication processor 20 starts measuring a period of time (ST305), and monitors the output of the first communication processor 10 until the period of time elapsing from step ST305 reaches the first duration T1 (ST310 and ST315). When the first communication processor 10 outputs the monitoring target notification (yes in ST310), the second communication processor 20 returns to step ST300 and repeats the above-described steps.

When the period of time elapsing from step ST305 has reached the first duration T1 without the monitoring target notification being output (yes in ST315), the second communication processor 20 resets a value of variable i, indicating the number of times received signal strength is obtained, to "0" (ST320). Then, the second communication processor 20 inputs the first command (HCI_RSSI) for requesting the first communication processor 10 to obtain received signal strength into the first communication processor 10, and obtains the received signal strength from the first communication processor 10 (ST325). The second communication processor 20 compares the received signal strength obtained from the first communication processor 10 to the threshold Sth (ST330). If the received signal strength has reached the threshold Sth (no in ST330), the second communication processor 20 returns to ST300, and repeats the above-described steps.

If the received signal strength is below the threshold Sth (yes in ST330), the second communication processor 20 starts measuring a period of time again (ST340). The second communication processor 20 monitors the output of the first communication processor 10 until the period of time elapsing from step ST340 reaches the second duration T2 (ST345 and ST350). If the monitoring target notification is output from the first communication processor 10 (yes in ST345), the second communication processor 20 returns to step ST320, resets the variable i to "0", and repeats the steps as of ST325.

When the time elapsing from step ST340 has reached the second duration T2 without the monitoring target notification being output (yes in ST350), the second communication processor 20 adds "1" to the variable i (ST355). If the variable i to which "1" has been added, does not reach N (no in ST360), the second communication processor 20 returns to step ST325, and repeats the steps as of step ST325.

If received signal strength remains below the threshold Sth (yes in ST330) and the monitoring target notification is not output from the first communication processor 10 (no in ST345), the second communication processor 20 repeats steps ST325 to ST355 N times. If the variable i reaches N after the steps are repeated (yes in ST360), the second communication processor 20 inputs the second command to terminate the connection with the counterpart apparatus into the first communication processor 10 (ST365).

As described above, if the same packet is continuously retransmitted in the packet retransmission process in the first layer, the monitoring target notification to be sent from the first layer to the second layer is not output. According to the present embodiment, when a period of time during which the monitoring target notification is not output reaches the first duration T1, the second communication processor 20 performs the received signal strength checking process (ST325 and ST360) N times at intervals of the second duration T2.

In the received signal strength checking process repeated N times, the first command is input into the first communication processor 10. In response to the first command, received signal strength obtained by the first communication processor 10 is compared to the threshold Sth.

While the received signal strength checking process is repeated N times, transmission power of the transmitting-side apparatus is changed in the first layer such that received signal strength falls within the target range (FIGS. 3 through 5). When it is verified that the received signal strength has reached the threshold Sth in the received signal strength checking process, it is assumed that the transmission power control process is functioning effectively. Thus, the connection with the counterpart apparatus is maintained.

Further, when the monitoring target notification is output from the first communication processor 10 in the predetermined period of time that includes the period of time in which the received signal strength checking process is repeated N times, there is a high possibility that a situation in which a packet is repeatedly retransmitted is eliminated (FIGS. 3 through 5). Thus, the connection with the counterpart apparatus is maintained in this case as well.

Conversely, when the received signal strength is below the threshold Sth in the received signal strength checking process repeated N times, and also the monitoring target notification is not output from the first communication processor 10 in at least the predetermined period of time that includes the period of time in which the received signal strength checking process is repeated N times, there is a high possibility that the packet retransmission process is in an infinite loop. In this case, in order to eliminate a situation in which a packet is repeatedly retransmitted, the second command is input into the first communication processor 10, thereby terminating the connection with the counterpart apparatus. Accordingly, the process performed in the second layer, which is higher than the first layer, eliminates a situation in which a packet is repeatedly retransmitted. Thus, an undesirable condition such as requiring turning the power on again can be avoided.

Further, according to the present embodiment, when the operation mode is the power saving mode, the connection with the counterpart apparatus is not terminated even when the monitoring target notification is not continuously output. Therefore, while avoiding repeated retransmission of a packet in normal mode, it is possible to stably maintain the power saving mode in which the output of the monitoring target notification becomes infrequent.

Although the embodiment of the present invention has been described above, the present invention is not limited thereto, and various variations may be made.

Figure 8:
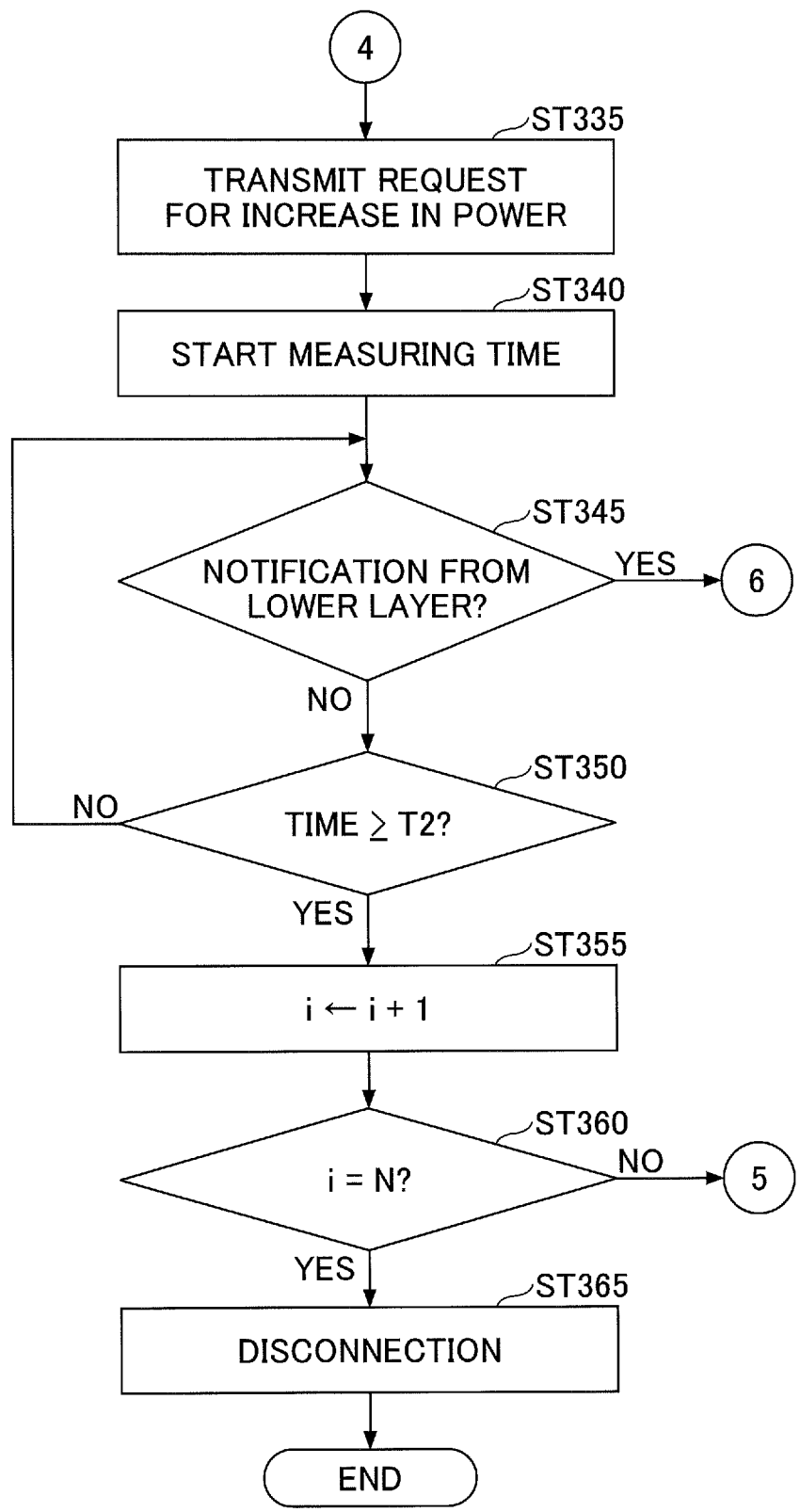
FIG. 8 is a flowchart illustrating a variation of the disconnection process performed by the second communication processor of the receiving-side communication apparatus.

In the above-described embodiment, the transmission power control process of the first layer is used to perform the disconnection process of the second layer. However, in other embodiments of the present invention, the disconnection process of the second layer may be performed without using the transmission power control process of the first layer. FIG. 8 is a flowchart illustrating a variation of the disconnection process, in which step ST335 is added between steps ST330 and ST340 of the flowchart illustrated in FIG. 7.

In ST330, the received signal strength is compared with the threshold Sth. As a result, if the received signal strength is below the threshold Sth, the second communication processor 20 inputs, into the first communication processor 10, a predetermined command for requesting a connected counterpart apparatus to increase transmission power in ST335. In response to the input of the command from the second communication processor 20, the first communication processor 10 transmits the LMP_incr_power_req" command to the connected counterpart apparatus. If the received signal strength is below the threshold Sth, the transmission power of the counterpart apparatus is increased in this variation as well. Accordingly, when it is verified that the received signal strength has reached the threshold Sth in the received signal strength checking process, it is assumed that the transmission power control process is functioning effectively. Thus, the connection with the counterpart apparatus is maintained.

Various aspects of the subject-matter described herein may be set out non-exhaustively below.

A communication apparatus that communicates with a counterpart apparatus in accordance with a hierarchical communication protocol that includes a first layer and a second layer higher than the first layer is provided. The communication apparatus may include a first communication processor configured to perform processes in the first layer, and a second communication processor configured to perform a process in the second layer. The processes performed in the first layer may include a packet retransmission process for, when an error in a packet is detected in the communication apparatus on a receiving side, sending a request to retransmit the same packet from the communication apparatus on the receiving side to the counterpart apparatus on a transmitting side, and retransmitting the same packet from the counterpart apparatus on the transmitting side in response to the request, a received signal strength obtaining process for obtaining received signal strength in response to a first command from the second layer, and a disconnection process for terminating connection with the counterpart apparatus in response to a second command from the second layer. The second communication processor may be configured to measure a period of time during which a notification, to be sent from the first layer to the second layer while the communication apparatus is connected to the counterpart apparatus, is not output from the first communication processor; repeat a received signal strength checking process a plurality of times at intervals of a second duration in a case where the measured period of time has reached a first duration; and input the second command into the first communication processor, in a case where the received signal strength is below the threshold in the received signal strength checking process repeated the plurality of times and the notification is not sent from the first communication processor in at least a predetermined period of time that includes a period of time during which the received signal strength checking process is repeated the plurality of times, wherein, in the received signal strength checking process repeated the plurality of times, the first command is input into the first communication processor, and received signal strength that is obtained by the first communication processor in response to the first command is compared to a threshold.

When the same packet is repeatedly retransmitted in the packet retransmission process, the notification, which is to be sent from the first layer to the second layer while the communication apparatus is connected to the counterpart apparatus, is not output from the first communication processor. According to the communication apparatus with the above configuration, when the period of time during which the notification is not output reaches the first duration, a received signal strength checking process is repeated the plurality of times at intervals of the second duration.

In the received signal strength checking process repeated the plurality of times, the first command is input into the first communication processor, and the received signal strength, which is obtained by the first communication processor in response to the first command, is compared to the threshold.

If it is determined that the received signal strength has reached the threshold in the received signal strength checking process repeated the plurality of times, the connection with the counterpart apparatus is maintained.

In addition, when the notification is sent from the first communication processor in at least the predetermined period of time that includes the period of time during which the received signal strength checking process is repeated the plurality of times, there is a high possibility that a situation in which the packet is repeatedly retransmitted is eliminated. Thus, the connection with the counterpart apparatus is maintained in this case as well.

When the received signal strength is below the threshold in the received signal strength checking process repeated the plurality of times, and also the monitoring target notification is not output from the first communication processor 10 in at least the predetermined period of time that includes the period of time in which the received signal strength checking process is repeated the plurality of times, the second command is input into the first communication processor, thereby terminating the connection with the counterpart apparatus. Accordingly, the process performed in the second layer autonomously eliminates a situation in which a packet is repeatedly retransmitted.

Preferably, the processes performed in the first layer may include a transmission power control process for sending a request to change transmission power from the communication apparatus on the receiving side to the counterpart apparatus on the transmitting side, such that the received signal strength at the communication apparatus on the receiving side falls within a target range, and changing the transmission power of the counterpart apparatus on the transmitting side in response to the request.

According to the above configuration, while the received signal strength checking process is repeated the plurality of times, the transmission power of the counterpart apparatus is changed in the first layer such that received signal strength falls within the target range. In a case where the received signal strength has reached the threshold while the received signal strength checking process is repeated the plurality of times, it is assumed that the transmission power control process is functioning effectively. Thus, the connection with the counterpart apparatus is maintained. An effectively functioning transmission power control process makes it easier to eliminate a situation in which a packet is repeatedly retransmitted.

Preferably, the processes performed in the first layer may include a transmission power control process for sending a request to increase transmission power from the communication apparatus on the receiving side to the counterpart apparatus on the transmitting side in response to a third command. The second communication processor is configured to, in the received signal strength checking process repeated the plurality of times, input the first command into the first communication processor, make a comparison between the threshold and received signal strength that is obtained by the first communication processor in response to the first command, and input the third command into the first communication processor in a case where the received signal strength is below the threshold based on the comparison.

According to the above configuration, in the received signal strength checking process repeated the plurality of times, the first command is input into the first communication processor, and received signal strength that is obtained by the first communication processor in response to the first command is compared to the threshold. Based on the comparison, the third command is input into the first communication processor in a case where the received signal strength is below the threshold. In a case where the received signal strength has reached the threshold while the received signal strength checking process is repeated the plurality of times, it is assumed that control of the transmission power of the counterpart apparatus in accordance with the third command is functioning effectively. Thus, the connection with the counterpart apparatus is maintained. By causing control of the transmission power of the counterpart apparatus in accordance with the third command to effectively function, it becomes possible to easily eliminate a situation in which a packet is repeatedly retransmitted.

Preferably, the processes performed in the first layer may include an operation mode switching process for switching operation modes of communication frequency between a normal mode that does not limit the communication frequency and a power saving mode that limits the communication frequency. The period of time measured by the second communication processor includes a continuous period of time during which the notification is not output from the first communication processor and the operation mode is the normal mode.

According to the above configuration, when the operation mode is the power saving mode, the connection with the counterpart apparatus is not terminated even if the notification is not continuously output from the first communication processor.

According to a second aspect of the present invention, there is provided a communication processing method for performing a process in the second layer by a computer, in a communication apparatus that communicates with a counterpart apparatus in accordance with a hierarchical communication protocol that may include a first layer and a second layer higher than the first layer. The communication apparatus includes a communication processor configured to perform processes in the first layer. The processes performed in the first layer may include a packet retransmission process for, when an error in a packet is detected in the communication apparatus on a receiving side, sending a request to retransmit the same packet from the communication apparatus on the receiving side to the counterpart apparatus on a transmitting side, and retransmitting the same packet from the counterpart apparatus on the transmitting side in response to the request, a received signal strength obtaining process for obtaining received signal strength in response to a first command from the second layer, and a disconnection process for terminating connection with the counterpart apparatus in response to a second command from the second layer. The communication processing method may include measuring a continuous period of time during which a notification, to be sent from the first layer to the second layer while the communication apparatus is connected to the counterpart apparatus, is not output from the first communication processor, and repeating a received signal strength checking process a plurality of times at intervals of a second duration in a case where the measured period of time has reached a first duration. Further, the communication processing method may include, in the received signal strength checking process repeated the plurality of times, inputting the first command into the first communication processor, and comparing, to a threshold, received signal strength that is obtained by the first communication processor in response to the first command, and inputting the second command into the first communication processor, in a case where the received signal strength is below the threshold in the received signal strength checking process repeated the plurality of times and the notification is not sent from the first communication processor in at least a predetermined period of time that includes a period of time during which the received signal strength checking process is repeated the plurality of times.

Preferably, the processes performed in the first layer may include a transmission power control process for sending a request to change transmission power from the communication apparatus on the receiving side to the counterpart apparatus on the transmitting side, such that received signal strength on the receiving side falls within a target range, and changing the transmission power on the transmitting side in response to the request.

Preferably, the processes performed in the first layer may include a transmission power control process for sending a request to increase transmission power from the communication apparatus on the receiving side to the counterpart apparatus on the transmitting side in response to a third command. The second communication processor is configured to, in the received signal strength checking process repeated the plurality of times, input the first command into the first communication processor, make a comparison between the threshold and received signal strength that is obtained by the first communication processor in response to the first command, and input the third command into the first communication processor in a case where the received signal strength is below the threshold based on the comparison.

Preferably, in the second aspect, the processes performed in the first layer may include an operation mode switching process for switching operation modes of communication frequency between a normal mode that does not limit the communication frequency and a power saving mode that limits the communication frequency. The measuring of the period of time includes measuring a period of time during which the notification is not output from the first communication processor and the operation mode is the normal mode.

According to a third aspect of the present invention, a non-transitory recording medium storing a program for causing the computer to execute the communication processing method according to the second aspect is provided.

In the above-described embodiments, an example in which the present invention is applied to BT communication has been described; however, the present invention may be applied to various other communication schemes.

Further, although the present invention has been described with reference to the embodiments, the present invention is not limited to the above-described embodiments. Various variations and modifications may be made without departing from the scope of the present invention.

What is claimed is:

1. A communication apparatus that communicates with a counterpart apparatus in accordance with a hierarchical communication protocol that includes a first layer and a second layer higher than the first layer, the communication apparatus comprising:
   a first communication processor configured to perform processes in the first layer; and
   a second communication processor configured to perform a process in the second layer,
   wherein the processes performed in the first layer include
      when an error in a packet is detected in the communication apparatus on a receiving side, sending a request to retransmit the same packet from the communication apparatus on the receiving side to the counterpart apparatus on a transmitting side, and retransmitting the same packet from the counterpart apparatus on the transmitting side in response to the request,
      obtaining received signal strength in response to a first command from the second layer, and
      terminating connection with the counterpart apparatus in response to a second command from the second layer, and
   wherein the second communication processor is configured to
      measure a continuous period of time during which a notification, to be sent from the first layer to the second layer while the communication apparatus is connected to the counterpart apparatus, is not output from the first communication processor,
      repeat a received signal strength checking process a plurality of times at intervals of a second duration in a case where the measured period of time has reached a first duration, and
      input the second command into the first communication processor, in a case where the received signal strength is below a threshold in the received signal strength checking process repeated the plurality of times and the notification is not sent from the first communication processor in at least a predetermined period of time that includes a period of time during which the received signal strength checking process is repeated the plurality of times,
      wherein, in the received signal strength checking process repeated the plurality of times, the first command is input into the first communication processor, and received signal strength that is obtained by the first communication processor in response to the first command is compared to a threshold.

2. The communication apparatus according to claim 1, wherein the processes performed in the first layer include sending another request to change transmission power from the communication apparatus on the receiving side to the counterpart apparatus on the transmitting side, such that received signal strength on the receiving side falls within a target range, and changing the transmission power on the transmitting side in response to said another request.

3. The communication apparatus according to claim 1, wherein the processes performed in the first layer include sending another request to increase transmission power from the communication apparatus on the receiving side to the counterpart apparatus on the transmitting side in response to a third command,
   wherein the second communication processor is configured to, in the received signal strength checking process repeated the plurality of times, input the first command into the first communication processor, make a comparison between the threshold and received signal strength that is obtained by the first communication processor in response to the first command, and input the third command into the first communication processor in a case where the received signal strength is below the threshold based on the comparison.

4. The communication apparatus according to claim 1, wherein the processes performed in the first layer further include switching operation modes of communication frequency between a normal mode that does not limit the communication frequency and a power saving mode that limits the communication frequency, and
   wherein the continuous period of time to be measured by the second communication processor includes a period of time during which the notification is not output from the first communication processor and the operation mode is the normal mode.

5. A communication processing method for performing a process in the second layer by a computer, in a communication apparatus that communicates with a counterpart apparatus in accordance with a hierarchical communication protocol that includes a first layer and a second layer higher than the first layer, wherein the communication apparatus includes a communication processor configured to perform processes in the first layer, and wherein the processes performed in the first layer include a packet retransmission process for, when an error in a packet is detected in the communication apparatus on a receiving side, sending a request to retransmit the same packet from the communication apparatus on the receiving side to the counterpart apparatus on a transmitting side, and retransmitting the same packet from the counterpart apparatus on the transmitting side in response to the request, a received signal strength obtaining process for obtaining received signal strength in response to a first command from the second layer, and a disconnection process for terminating connection with the counterpart apparatus in response to a second command from the second layer, and the communication processing method comprising:

measuring a continuous period of time during which a notification, to be sent from the first layer to the second layer while the communication apparatus is connected to the counterpart apparatus, is not output from the first communication processor, repeating a received signal strength checking process a plurality of times at intervals of a second duration in a case where the measured period of time has reached a first duration, and inputting the second command into the first communication processor, in a case where the received signal strength is below a threshold in the received signal strength checking process repeated the plurality of times and the notification is not sent from the first communication processor in at least a predetermined period of time that includes a period of time during which the received signal strength checking process is repeated the plurality of times, wherein, in the received signal strength checking process repeated the plurality of times, the first command is input into the first communication processor, and received signal strength that is obtained by the first communication processor in response to the first command is compared to a threshold.

6. The communication processing method according to claim 5, wherein the processes performed in the first layer include sending another request to change transmission power from the communication apparatus on the receiving side to the counterpart apparatus on the transmitting side, such that received signal strength on the receiving side falls within a target range, and changing the transmission power on the transmitting side in response to said another request.

7. The communication processing method according to claim 5, wherein the processes performed in the first layer include sending another request to increase transmission power from the communication apparatus on the receiving side to the counterpart apparatus on the transmitting side in response to a third command, wherein the second communication processor is configured to, in the received signal strength checking process repeated the plurality of times, input the first command into the first communication processor, make a comparison the threshold with received signal strength that is obtained by the first communication processor in response to the first command, and input the third command into the first communication processor in a case where the received signal strength is below the threshold based on the comparison.

8. The communication processing method according to claim 5, wherein the processes performed in the first layer include switching operation modes of communication frequency between a normal mode that does not limit the communication frequency and a power saving mode that limits the communication frequency, and wherein the period of time to be measured includes a period of time during which the notification is not output from the first communication processor and the operation mode is the normal mode.

9. A non-transitory recording medium storing a program for causing the computer to execute the communication processing method according to claim 5.

* * * * *